G. P. GREENWOOD.
FERTILIZER DISTRIBUTER.
APPLICATION FILED SEPT. 1, 1910.
1,111,895.
Patented Sept. 29, 1914.
3 SHEETS—SHEET 1.
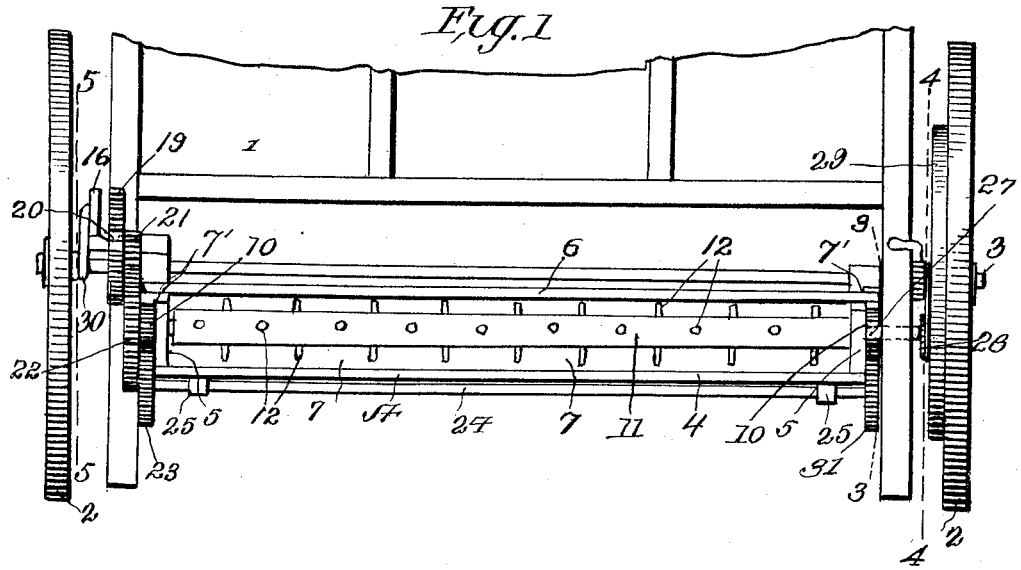
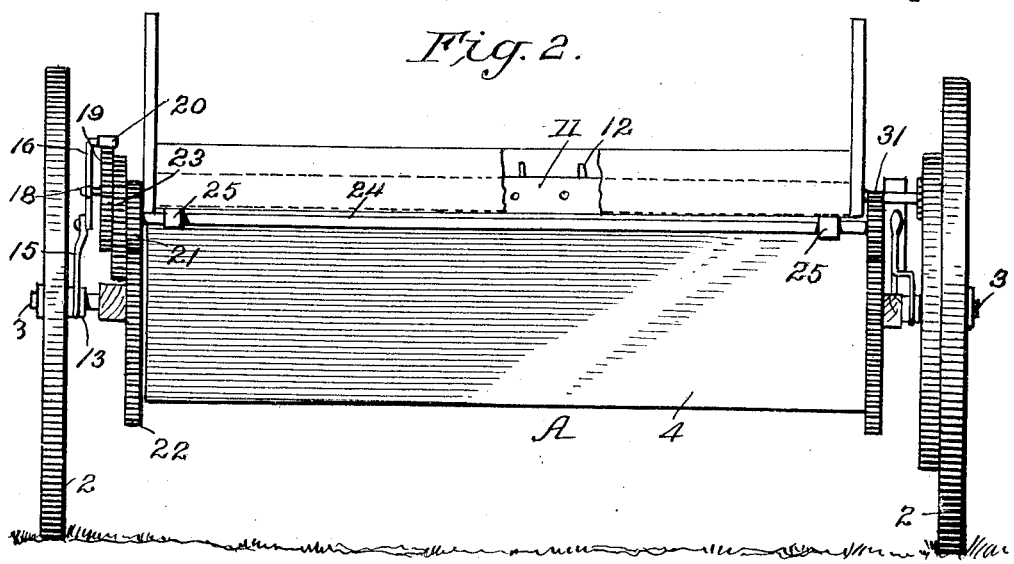
Witnesses
L. D. Lindsay
G. F. Baker
George P. Greenwood, Inventor
By Greeley & McIntire
Attorney G. P. GREENWOOD.
FERTILIZER DISTRIBUTER.
APPLICATION FILED SEPT. 1, 1910.
1,111,895.
Patented Sept. 29, 1914.
3 SHEETS—SHEET 2.
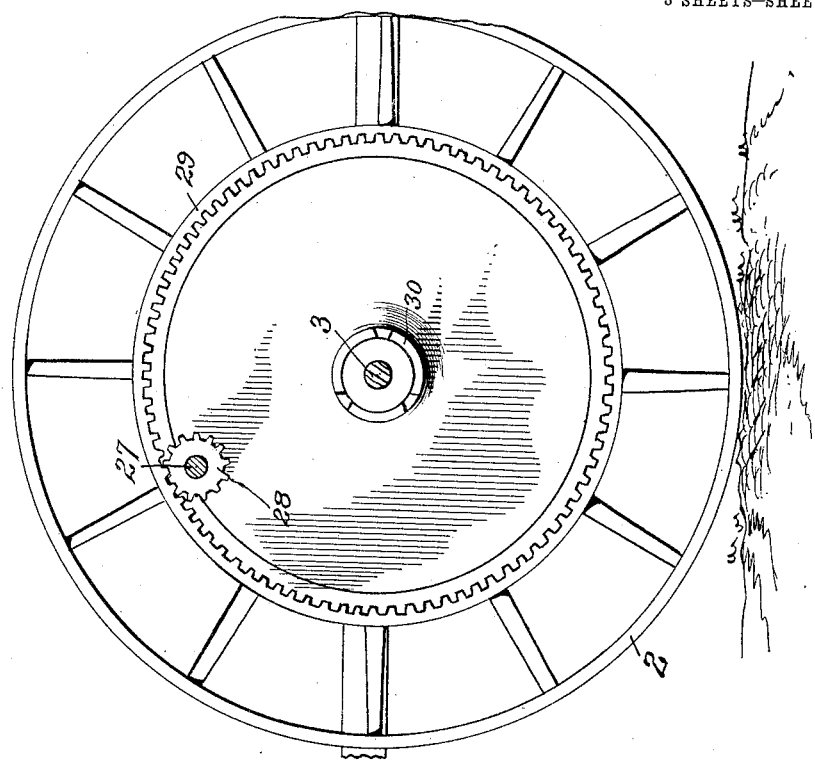
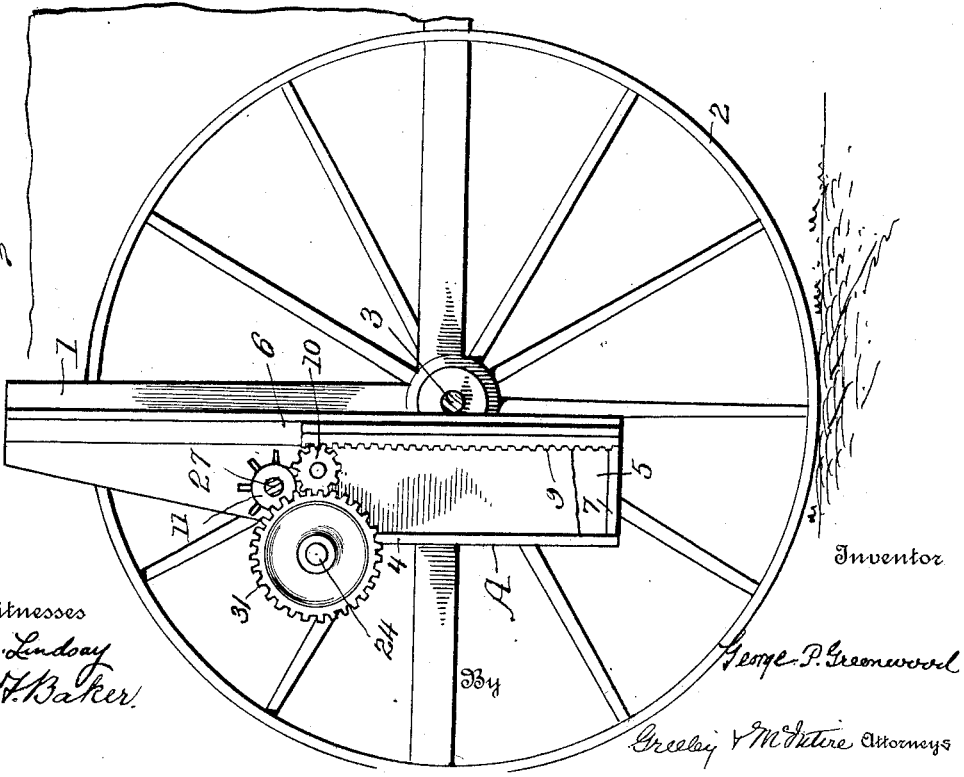
Witnesses
L. D. Lindsay
G. H. Baker
Inventor
George P. Greenwood
By Greeley & McIntire Attorneys

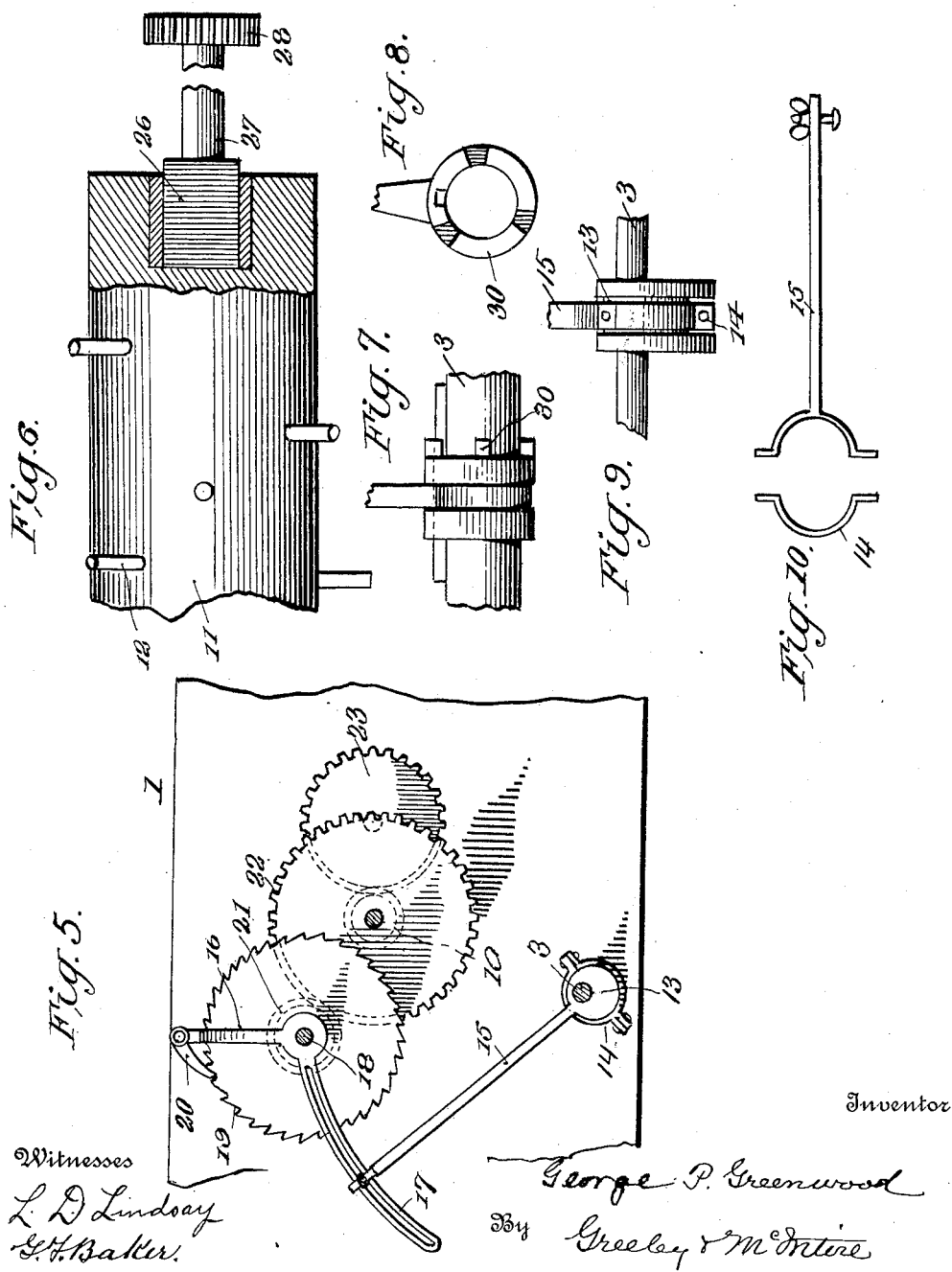

UNITED STATES PATENT OFFICE.

GEORGE P. GREENWOOD, OF BILLERICA, MASSACHUSETTS.

FERTILIZER-DISTRIBUTER.

1,111,895.  Specification of Letters Patent.  Patented Sept. 29, 1914.

Application filed September 1, 1910. Serial No. 580,048.

*To all whom it may concern:*

Be it known that I, GEORGE P. GREEN-WOOD, a citizen of the United States, residing at Billerica, in the county of Middlesex and State of Massachusetts, have invented certain new and useful Improvements in Fertilizer-Distributers; and I do hereby declare the following to be a full, clear, and exact description of the invention, such as will enable others skilled in the art to which it appertains to make and use the same.

The present invention relates to certain new and useful improvements in the construction of fertilizer distributers, and the object of the invention is the provision of a device of this character embodying novel features of construction whereby fertilizer will be distributed in an effective and uniform manner regardless of whether the same be in a wet, lumpy, or dry condition.

The invention further contemplates the provision of a fertilizer distributer which can be easily and quickly adjusted so as to regulate the amount of fertilizer which is distributed per acre or in a given time.

With these and other objects in view, the invention consists in certain combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a top plan view of a fertilizer distributer constructed in accordance with the invention. Fig. 2 is a rear view of the same. Fig. 3 is a transverse sectional view on the line 3—3 of Fig. 1. Fig. 4 is a similar view on the line 4—4 of Fig. 1. Fig. 5 is also a similar view on the line 5—5 of Fig. 1, and Figs. 6 and 7, 8, 9 and 10 are detail views.

Corresponding and like parts are referred to in the following description and indicated in all the views of the drawing by the same reference characters.

Specifically describing the present embodiment of the invention, the numeral 1 designates the main frame of the fertilizer distributer, the said frame being supported by the drive wheels 2 which are mounted upon the axle 3. Any suitable means may be employed for applying draft to the machine for moving the same across a field in the required manner. The fertilizer is designed to be placed within a box A which extends transversely across the frame, the back 4 and ends 5 of the box being rigidly mounted, while the front 6 and bottom 7 of the box are movably mounted. The ends of the front 6 of the fertilizer box are slidably mounted within the vertical guideways 7′ and are provided with the racks 9 which are engaged by the pinions 10. A distributing roller 11 is mounted over the top of the box A and is provided with suitable teeth 12 for acting upon the fertilizer to throw it over the top of the back 4 of the box. The fertilizer which is placed within the box A rests upon the bottom 7 thereof, and it will be obvious that by gradually raising the front 6 and bottom 7 of the box, the fertilizer will be fed to the distributing roller 11. To return bottom of box to normal position after filling, the ratchet 20 is disengaged from the toothed wheel 19, and bottom 7 of box A is forced to the lowest position.

An eccentric 13 is mounted upon the axle 3 adjacent one of the drive wheels 2 with which it has a pawl and ratchet connection so that the eccentric is turned when the fertilizer distributer is moved forward, while it remains stationary when the machine is moving rearward. This eccentric 13 is engaged by a strap 14 at the lower end of a pitman or link 15, the upper end of the pitman being adjustably connected to a lever 16. In the present instance the pitman is engaged by a set screw which operates in a slot 17, and the arm of the lever to which the pitman is connected is curved in the arc of a circle. This lever is pivoted upon a stub shaft 18 which has a ratchet wheel 19 mounted thereon, the opposite end of the lever being provided with a pawl 20 which engages the teeth of the said ratchet wheel.

It will be obvious that as the machine advances across a field, the eccentric 13 will revolve so as to impart a reciprocating movement to the pitman 15. This reciprocating movement of the pitman serves to oscillate the lever 16 and to slowly revolve the ratchet wheel 19. Rigid with this ratchet wheel 19 is a pinion 21 which meshes with a gear wheel 22 having one of the pinions 10 rigid therewith. This pinion 10 which is rigid with the gear wheel 22 meshes with a gear wheel 23 which is rigid with a shaft 24 extending across the back of the fertilizer receiving box and journaled in bearings 25 applied thereto. The opposite end of the shaft 24 is provided with a gear wheel 31 which meshes with the other pinion 10, so that both of the pinions 10 receive power from one of the drive wheels 2 when the machine is being advanced across a field. When the upper end of the pitman 15 is moved to the extreme outer end of the lever 16, the wheel 19 will be turned very slowly and the upward movement of the bottom and front of the fertilizer receiving box will be correspondingly slow. A minimum amount of the fertilizer will then be fed to the distributing roller. However, by moving the upper end of the pitman 15 toward the pivot point of the lever 16, the speed of rotation of the wheel 19 can be increased so as to cause a larger amount of the fertilizer to be fed to the distributing roller, a maximum amount of the fertilizer being distributed when the pitman is moved to the extreme inner end of the slot 17.

One end of the distributing roller 11 is journaled in one of the ends of the box A, while the opposite end of the fertilizer roller is formed with an angular recess which loosely receives an angular head 26 at the inner end of a short shaft 27 which is suitably journaled upon the main frame and is provided at its outer end with a pinion 28, the said pinion meshing with an internally toothed wheel 29 loose upon the axle 3 at the opposite end of the machine to the eccentric 13 thereby furnishing driving means for the distributing roller. A suitable clutch mechanism 30 is provided for locking the wheel 29 with the axle 3 or permitting it to turn freely thereon.

From the foregoing description, it will be apparent that when the machine is in operation, the bottom of the fertilizer receiving box will be gradually raised so as to bring the fertilizer into contact with the distributing roller 11, the said distributing roller acting upon the fertilizer to throw it over the top of the back 4 of the box.

While I have specifically described one embodiment of the invention, I do not wish to be restricted to the exact details shown therein, since minor changes and alterations can be made without departing in any manner from the spirit of the invention.

Having thus described the invention, what I claim as new and desire to secure by Letters Patent, is:—

1. A fertilizer distributer comprising, in combination, a distributing roller mounted over a distributing box, said box having its bottom and one side conencted together, and means for gradually moving the bottom and said connected side of the box toward the roller in a substantially vertical rectilinear path.

2. A fertilizer distributer comprising, in combination, a distributing roller mounted over a distributing box, said box comprising a rigid unitary structure having its bottom and one side connected together; guide bottom and one side connected together, and means for guiding the movement of said bottom and said side in a substantially vertical rectilinear path; and means for so moving said bottom and said side.

3. A fertilizer distributer comprising, in combination, a distributing box having a fixed portion and a relatively movable bottom and side wall secured together, a distributing roller mounted over said box, a pair of racks secured to said side wall, a pair of pinions meshing with said racks, and means for rotating said pinions to move said bottom and side wall toward said roller in a substantially vertical rectilinear path.

4. A fertilizer distributer comprising, in combination, distributing means mounted over a distributing box, said box comprising a rigid unitary structure having its bottom and one side connected together; guide means for guiding the movement of said bottom and side in a substantially vertical rectilinear path; and means for so moving said bottom and one side.

5. A fertilizer distributer comprising, in combination, a distributing roller; a distributing box over which said roller is mounted, said box having its bottom and one side connected together to form a rigid unitary structure; and means for imparting a gradual relative movement to said roller and said structure in a generally vertical direction one to the other.

6. A fertilizer distributer comprising, in combination, a distributing roller; a distributing box over which said roller is mounted, said box comprising a rigid unitary structure having its bottom and one side connected together; guide means for guiding the movement of said structure in a substantially vertical rectilinear path; and means for imparting to said structure and roller a relative movement in a generally vertical direction one to the other.

7. A fertilizer distributer comprising, in combination, distributing means; a distributing box over which said distributing means is mounted, said box comprising a rigid unitary structure having its bottom and one side connected together; guide means for guiding the movement of said structure in a substantially vertical rectilinear path; and means for imparting to said structure and distributing means a relative movement in a generally vertical direction one to the other.

In testimony whereof I affix my signature in presence of two witnesses.

GEORGE P. GREENWOOD.

Witnesses:
WINIFRED H. BRYAN,
STEPHEN P. CUSHMAN.

Copies of this patent may be obtained for five cents each, by addressing the "Commissioner of Patents, Washington, D. C."